United States Patent
Ashwood-Smith

(10) Patent No.: US 8,199,755 B2
(45) Date of Patent: Jun. 12, 2012

(54) METHOD AND APPARATUS ESTABLISHING FORWARDING STATE USING PATH STATE ADVERTISEMENTS

(75) Inventor: Peter Ashwood-Smith, Hull (CA)

(73) Assignee: Rockstar Bidco LLP, New York, NY (US)

( * ) Notice: Subject to any disclaimer, the term of this patent is extended or adjusted under 35 U.S.C. 154(b) by 1333 days.

(21) Appl. No.: 11/525,594

(22) Filed: Sep. 22, 2006

(65) Prior Publication Data
US 2008/0075016 A1 Mar. 27, 2008

(51) Int. Cl.
*H04L 12/28* (2006.01)
(52) U.S. Cl. ......... 370/392; 370/389; 370/390; 370/396
(58) Field of Classification Search .......... 370/252, 370/390, 392, 389, 396
See application file for complete search history.

(56) References Cited

U.S. PATENT DOCUMENTS

| | | | | |
|---|---|---|---|---|
| 5,995,503 A * | 11/1999 | Crawley et al. | ............... | 370/351 |
| 6,026,077 A * | 2/2000 | Iwata | ............... | 370/254 |
| 6,418,476 B1 * | 7/2002 | Luciani | ............... | 709/238 |
| 6,606,325 B1 * | 8/2003 | Cain | ............... | 370/410 |
| 6,757,258 B1 * | 6/2004 | Pillay-Esnault | ............... | 370/254 |
| 7,031,262 B2 * | 4/2006 | Vasseur et al. | ............... | 370/248 |
| 7,209,449 B2 * | 4/2007 | Tang et al. | ............... | 370/238 |
| 7,428,219 B2 * | 9/2008 | Khosravi | ............... | 370/254 |
| 7,433,969 B2 * | 10/2008 | Aggarwal et al. | ............... | 709/242 |
| 7,567,577 B2 * | 7/2009 | Thubert et al. | ............... | 370/401 |
| 2003/0185226 A1 * | 10/2003 | Tang et al. | ............... | 370/428 |
| 2004/0039839 A1 * | 2/2004 | Kalyanaraman et al. | ...... | 709/238 |
| 2004/0136371 A1 * | 7/2004 | Muralidhar et al. | ............... | 370/389 |
| 2006/0092974 A1 * | 5/2006 | Lakshman et al. | ............... | 370/469 |

* cited by examiner

*Primary Examiner* — Ricky Ngo
*Assistant Examiner* — Dewanda Samuel
(74) *Attorney, Agent, or Firm* — Anderson Gorecki & Manaras LLP

(57) ABSTRACT

Paths may be advertised on a network implementing a link state routing protocol by using path state advertisement that are distributed in the same manner as link state advertisements. The path state advertisements contain path entries, each of which includes a globally unique path ID and path information such as a series of nodes or links that defines the path through the network. When a path state advertisement is received by a network element, the network element will evaluate the path entries in the path state advertisement to determine if the path state advertisement is relevant and, if necessary, install forwarding state for the relevant path entries. Path state advertisements not relevant to a network element are not used to affect forwarding state on the network element. Label based forwarding may then be used by the network elements to forward data along the path, in which the globally unique path ID is used as the label for the data.

5 Claims, 3 Drawing Sheets

METHOD AND APPARATUS ESTABLISHING FORWARDING STATE USING PATH STATE ADVERTISEMENTS

BACKGROUND OF THE INVENTION

1. Field of the Invention

The present invention relates to communication networks and, more particularly, to a method and apparatus for establishing forwarding state using path state advertisements.

2. Description of the Related Art

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the devices. A particular protocol data unit may be handled by multiple network elements and cross multiple communication links as it travels between its source and its destination over the network. As used herein, the term "packet" will be used to refer to all types of protocol data units, not just IP packets.

Routing information on a network, such as the network illustrated in FIG. 1, may be exchanged using a variety of different protocols. One class of routing protocols that may be used to exchange routing information are commonly referred to as link state routing protocols.

Link state routing protocols use update messages to advertise routing information about links to which it is connected. Update messages will be referred to herein as Link State Advertisements (LSAs). Network elements on the network receive the LSAs and use the information from the LSAs to build a link state database representative of the topology of the network. Examples of common link state routing protocols include Open Shortest Path First (OSPF) and Intermediate System to Intermediate System (IS-IS), although other link state routing protocols may exist or be developed as well.

Another class of protocols, referred to herein as signaling protocols, are used to establish paths through the network so that traffic may be forwarded across the network along a particular path. For example, a network element may compute a path through the network by looking at its link state database, and then use a protocol such as Label Distribution Protocol (LDP) to cause labels to be distributed to form an MPLS label switched path across the network. In this example, once the labels have been distributed, the routers along the path will be able to forward data on the path from the source to the destination on the network so that all traffic intended to be carried by the path actually is able to follow the path through the network. Thus, the signaling protocol is used to cause the routers or other network elements on the path to install appropriate forwarding state for that traffic.

There are many different signaling protocols that have been developed to enable paths to be set up through the network. Examples of signaling protocols include Private Network to Network Interface (PNNI), Signaling System Seven (SS7), Reservation Protocol Traffic Engineering (RSVP-TE), and LDP which was mentioned above and is used with MultiProtocol Label Switching (MPLS), although there are undoubtedly other protocols as well that have been proposed or used to establish paths through a network.

Depending on the particular signaling protocol being used, the amount of overhead required to signal a particular path may vary significantly, although generally most signaling protocols require each path to be established individually. Hence, signaling paths on the network may consume significant resources particularly where there are large numbers of paths to be established or altered.

SUMMARY

Network elements on a communication network configured to use a link state routing protocol will build a link state database by collecting link state advertisements from other network elements on the network. The link state database may then be used by the network element to calculate one or more paths through the network. Paths may pass through the network element but are not required to pass through the network element.

Paths may be advertised on the communication network using a path state advertisement containing path entries. Each path entry contains a globally unique path ID and path information such as a series of nodes or links that defines the path through the network. The path state advertisement may then be advertised onto the network using the same distribution system that was used to distribute link state advertisements.

When a path state advertisement is received by a network element, the network element will forward the path state advertisement as it would a normal link state advertisement, and it will also evaluate the path entries in the path state advertisement to determine if the path state advertisement is relevant to it. For example, the network element will determine for each path entry in the path state advertisement if the path entry references the network element or a link connected to the network element. If the path entry is relevant to the network element, the network element will install forwarding state for that path in a manner similar to how it would normally have installed forwarding state had the path been established using another path signaling protocol. If the path entry does not reference the network element the network element will ignore that path entry and move on to the next entry in the path state advertisement.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
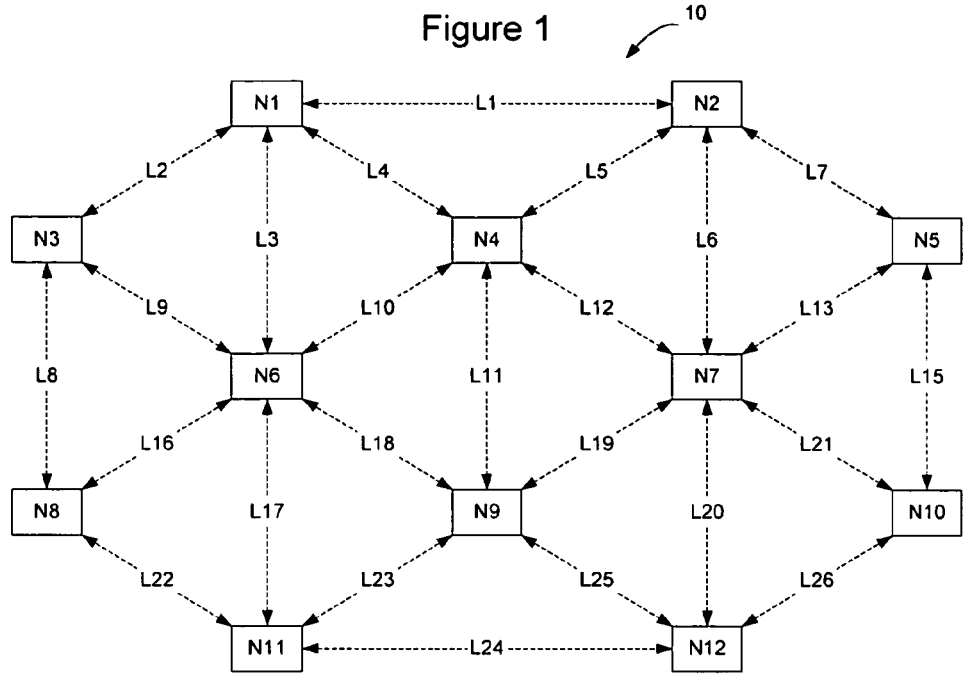
FIG. 1 is a functional block diagram a portion of an example communication network.

FIG. 1 illustrates an example communication network 10 having a plurality of nodes N1-N12 interconnected by links L1-L26. The nodes may be routers, switches, or other types of network elements and the links may be formed from copper wires, optical fibers, wireless transmissions, or using another type of communication technology. The invention is not limited to the particular network used to implement the communication network, as the invention may be used in many different types of communication networks. The invention is similarly not limited to a network having the configuration shown in FIGS. 1 and 2 as many different network configurations are known and may be used in connection with embodiments of the invention discussed herein.

In a link state routing protocol, such as Open Shortest Path First (OSPF) or Intermediate System to Intermediate System (IS-IS), routers or switches collect information about the state of links to which they connect and advertise that information on the network. This information is transmitted using Link State Advertisements (LSAs) to enable the network elements to build link state databases.

Since each network element knows how all other network elements are interconnected, the network elements may all independently calculate the least cost path through the network between particular end points. For example, in the example network shown in FIG. 1, the network element N3 may use the information in its link state database to calculate a first path P1 and a second path P2. Although the paths in this example also pass through node N3, the invention is not limited in this manner as the particular paths to be established on the network need not pass through the node that initially advertises the path in a path state advertisement.

Figure 2:
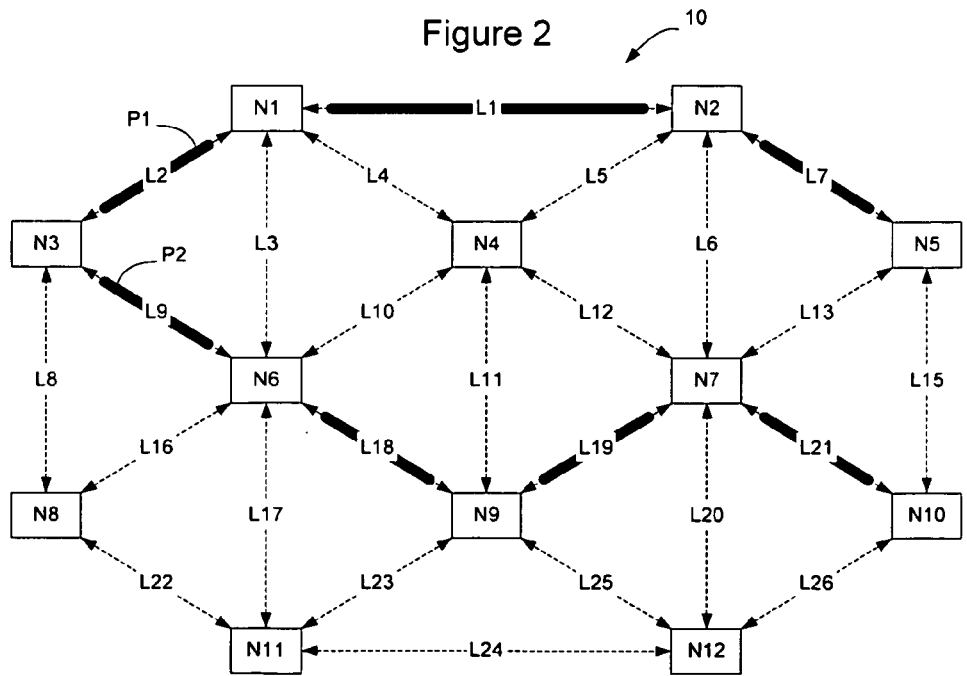
FIG. 2 is a functional block diagram illustrating paths through the example communication network of FIG. 1.

Examples of two hypothetical paths that may be calculated are shown in FIG. 2. As shown in FIG. 2, the node N3 may calculate a path P1 that includes nodes N1, N2, and N5 or, equivalently, links L2, L1, and L7. Similarly, the node N3 may calculate a path that includes nodes N6, N9, N7, and N10 (or links L9, L18, L19, and L21). The paths may be calculated by looking for a least cost path or, alternatively where traffic engineering information has been exchanged, using other criteria. The invention is not limited to a particular way of calculating paths through the network as many different criteria may be used to create a path. Indeed, the paths may also be manually created for example by a network administrator. Thus, many different mechanisms may be used to create paths that may then be advertised using path state advertisement messages.

Once one or more paths have been calculated, the paths may need to be set up on the network so that the nodes along the path know how to forward packets along those paths. According to an embodiment of the invention, path state advertisements may be flooded onto the network using the same distribution mechanism as is used for link state advertisements, but which contain path information instead of link state information. The path state advertisements may contain information on a single path or may contain information for multiple paths. Since the path state advertisements are to be flooded on the network, multiple paths may be set up using a single path state advertisement.

When a network element receives a path state advertisement, it will forward the path state advertisement as it would an ordinary link state advertisement. Additionally, the network element will parse the information contained in the path state advertisement to determine whether any of the paths pass through it or any of the links to which it is connected. If the path state advertisement doesn't pertain to the network element the path state advertisement will not be used to affect forwarding state on this network element. If the path state advertisement does have one or more paths passing through the network element, however, the network element will install the forwarding state for those paths into its forwarding tables in a manner similar to how it would ordinarily install forwarding state for a path that was established using a signaling protocol. The manner in which network elements handle path state advertisements will be discussed in greater detail below.

Figure 3:
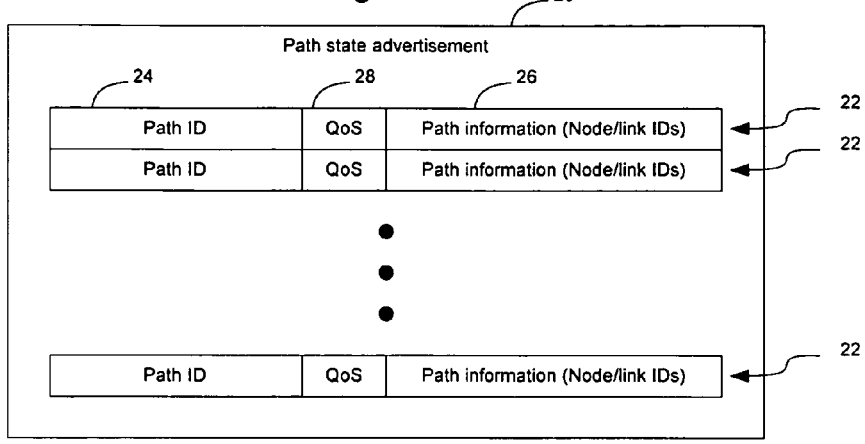
FIG. 3-6 are a functional block diagrams of path state advertisements containing path information according to an embodiment of the invention.
Figure 4:
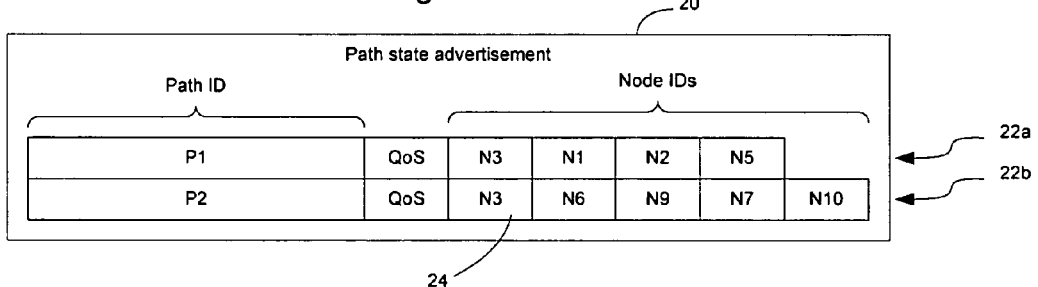
Figure 5:
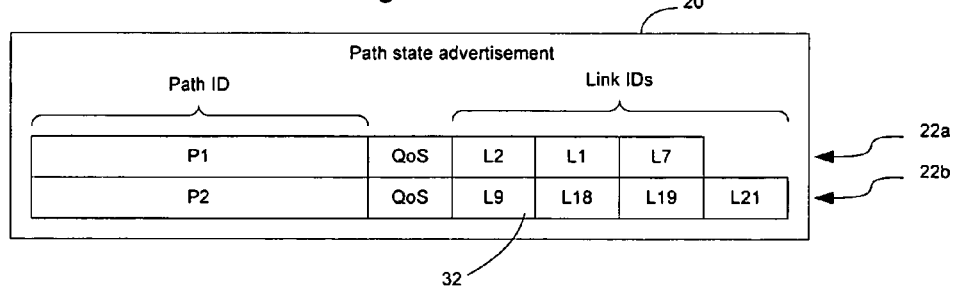

As discussed in greater detail below, the path information contained in the path state information may contain a path identifier and a list of network elements or links that are to be used to establish the path through the network. FIGS. 3-5 show examples of path state advertisements according to an embodiment of the invention. Other formats may be used as well, however, and the invention is not limited to the particular path state advertisements shown in FIGS. 3-5.

As shown in FIG. 3, the path state advertisement 20 may include path entries 22, each of which specifies a path through the network. The path entries 22 include, for example, a path identifier 24 that is used to identify the path and data subsequently transmitted on the path, and path information 26 specifying a list of nodes, links, or both, that define the path through the network. Optionally, quality of service to be provided to traffic on the path may also be specified using optional quality of service bits 28. Other information may be contained in the path entries as well, and the invention is not limited to path entries that have only the illustrated set of fields as many additional fields may be included in each of the path entries. Similarly, the path state advertisement may contain one or more fields of administrative information that may be used to explain the format of the data contained in the path state advertisement. The invention is not limited to a particular format that is used to implement the path state advertisements.

FIG. 4 shows an embodiment of a path state advertisement 20 in which the path entries 22 include node information 30 as the path information 26. The node information, in this example, may be lists of node IDs that define the paths through the network. The path entries shown in FIG. 4 have been formatted to show how paths P1 and P2 discussed above in connection with in FIG. 2 may be created. Specifically, path entry 22a contains a path ID=P1, the optional QoS bits, and a series of node IDs that define the path through the network of FIG. 2 which, in this example, include nodes N3, N1, N2, and N5. The path entry 22b similarly defines Path P2 to include nodes N3, N6, N9, N7, and N10.

FIG. 5 shows another embodiment of a link state advertisement 20 in which the path entries 22 include link information 32 as the path information. The path state advertisements may thus be formatted in a manner similar to that discussed above in connection with FIG. 4, but the path information will reference the links to be used to establish the path rather than the nodes that are to be used to establish the path. In the particular example, path P1 is shown as including links L2, L1, and L7, and path P2 is shown as including links L9, L18, L19, and L21.

Figure 6:
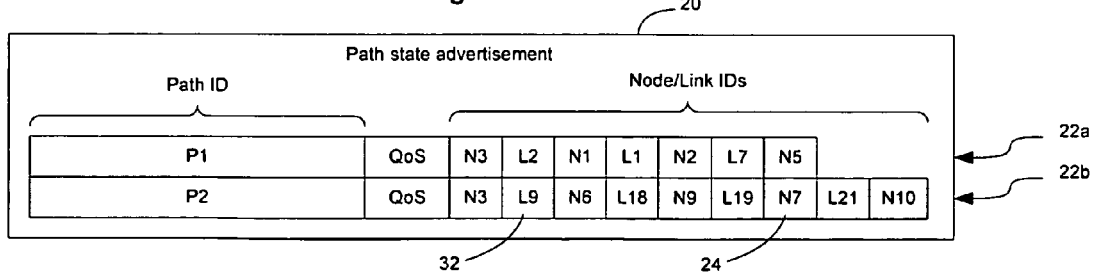

FIG. 6 shows yet another embodiment of a link state advertisement 20 in which the path entries 22 include both node information 24 and link information 32 as the path information. The path state advertisements may thus be formatted in a manner similar to that discussed above in connection with FIG. 4, but the path information will reference both the nodes and links that are to be used to establish the path through the network. In the particular example, path P1 is shown as including nodes/links N3, L2, N1, L1, N2, L7, and N5, and path P2 is shown as including nodes/links N3, L9, N6, L18, N9, L9, N7, L21, and N10.

The path identifiers may be globally unique path identifiers. Using globally unique path identifiers enables the network elements on the network to perform label based forwarding. Label based forwarding enables a network element to take one or more defined actions for packets that have a particular label regardless of where the packet arrived at the network element. The use of globally unique path identifiers enables the path identifiers to be used as the label for that traffic by all network elements on the path so that label switching is not required to forward traffic along the path through the network.

One example of a globally unique path identifier that may be used to identify paths on the network may be a concatenation or other combination of the destination ID and a Virtual Local Area Network (VLAN) tag. Other ways of establishing globally unique path identifiers may be used as well, however, and the invention is not limited to the use of this particular type of path identifier.

When a node receives a path state advertisement, it will forward the path state advertisement the same way it would forward a regular link state advertisement. In addition, the network element will evaluate the path entries 22 to determine if one or more of the path entries contains a path that will pass through it. Where the path information 26 contained in the path entries 22 contain node information, this may be performed by looking for path entries that include the node's node ID as one of the hops on the path. Where the path information contained in the path entries contain link information, this may be performed by looking for path entries that include a link ID to which the node is connected.

In either embodiment, if a node locates a path entry 22 that indicates that the path will pass through the node, the node will install forwarding state by causing the path ID to be associated with a particular forwarding action that will cause traffic on the path to be forwarded along the path specified by the path information 26 in the path entry 22.

For example, assume that node N2 in FIG. 2 receives the path state advertisement shown in FIG. 4. Node 2 would forward the path state advertisement as it would a normal link state advertisement and, additionally, would evaluate the path entries 22 contained in the path state advertisement to determine if any of the path entries referenced it. In this example, node N2 would evaluate path entry 22a and determine that it is one of the nodes listed in the path information section of the path entry associated with path ID=P1. Accordingly, node N2 would know that traffic identified by path identifier P1 should be forwarded to node N5. This forwarding state information may be used to update the data plane of the node so that traffic subsequently received by node N2 that has a label—path ID=P1—will be forwarded along path P1 to node N5. Similar actions may be taken with respect to the path state advertisement shown in FIG. 5.

Optionally, once the forwarding state has been created for the path, the node may also transmit a commit message or other type of message back toward the originating node so that the node that originated the path state advertisement is able to confirm that all nodes on the path have received the message and processed the message, and that the path will be set up as desired. Although these messages may optionally be implemented, the invention is not limited in this manner as many different ways of confirming paths may be used if desired once the path has been advertised using the path state advertisement messages described herein.

Once a path has been established (and optionally confirmed) traffic may be transmitted on the path by causing a label containing the path identifier to be applied to packets that are to travel on the path. When a network element receives a packet with the path identifier, it will perform the action associated with the forwarding state that was derived from the earlier received path entry that defined the path. For example, node N2 will forward all traffic with path ID P1 to node N5. Thus, the nodes may use label based forwarding without also considering where the traffic arrived.

Figure 7:
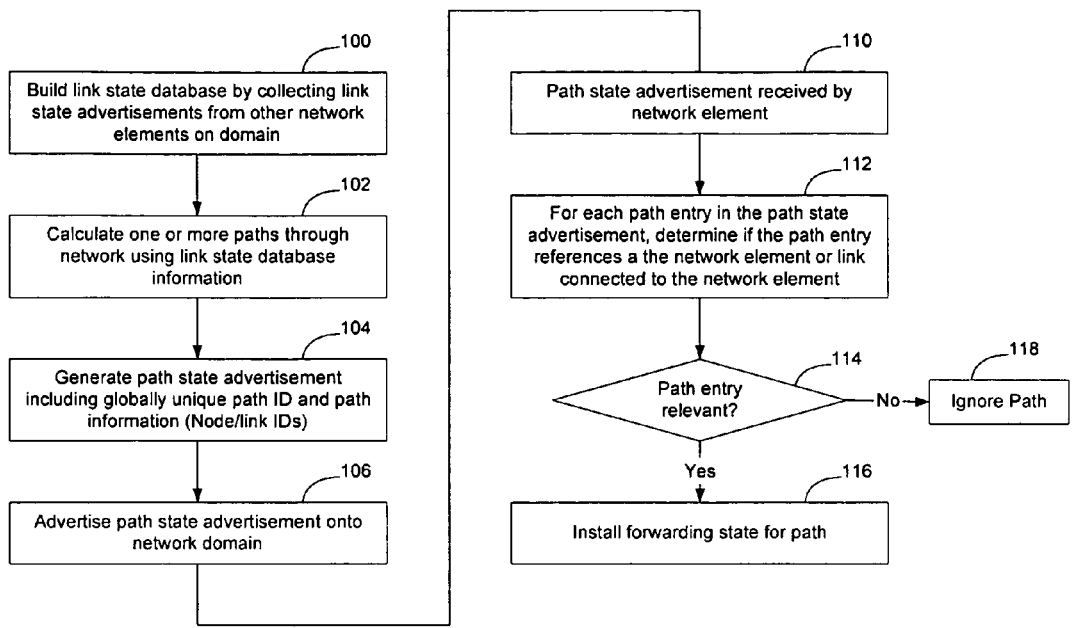
FIG. 7 is a flow chart illustrating a process of establishing forwarding state on a communication network such as the network of FIGS. 1-2 using path state advertisements such as the path state advertisements of FIGS. 3-5 according to an embodiment of the invention.

FIG. 7 shows a process that may be used to implement an embodiment of the invention. As shown in FIG. 7, network elements on the communication network will build an ordinary link state database by collecting link state advertisements from other network elements on the domain (100). The link state database may then be used to calculate one or more paths through the network (102). Distribution of link state advertisements and the manner in which link state advertisements are used or exchanged is not expected change in connection with implementation of an embodiment of the invention.

Once a network element has calculated one or more paths, it may generate a path state advertisement (104) which, as discussed above, may contain one or more path entries, each of which will have a globally unique path ID and path information. The path state advertisement may then be advertised onto the network using the distribution system that was also used to distribute link state advertisements (106). Thus, distribution of the path state advertisements requires no additional distribution mechanism to be established to enable all nodes on the network to receive the advertisement. It does, however, require either that the path state advertisements travel inside existing protocol data units (with appropriate differentiation mechanisms) or in new protocol data units that share the same flooding header and processing as the existing link state advertisement protocol data units.

When a path state advertisement is received by a network element (10), the network element will forward the path state advertisement as it would a normal link state advertisement, and it will also evaluate the path entries in the path state advertisement to determine if the path state advertisement is relevant to it (112). Thus, the network element will determine for each path entry in the path state advertisement if the path entry references the network element or a link connected to the network element (114). If the path entry is relevant to the network element, the network element will install forwarding state for that path (116) in a manner similar to how it would normally have installed forwarding state had the path been established using another path signaling protocol. If the path entry does not reference the network element, the network element will ignore that path entry and move on to the next path entry in the path state advertisement (118).

Where label based forwarding is used to forward packets through the nodes on the network, the paths that are established using the path state advertisements discussed herein will be one directional. For example, path P1 is used to carry traffic from node N3 to node N5 and the intermediate nodes on the path, when they receive traffic with a label=P1, will forward the traffic in the direction of node N5. To create a bi-directional path, the forwarding state on the nodes may be changed such that the nodes forward traffic based on both input link/port and label. In this instance, when a node receives a path state advertisement the node may install forwarding state in both directions along the path so that it is able to distinguish between traffic traveling in both directions and may forward the traffic in the correct direction along the path.

Alternatively, if a bi-directional path is to be established, the end node N5 may create a second path state advertisement and re-advertise the path P1' having the same set of nodes/links in reverse order and with a different globally unique path ID. Although the traffic on the two paths P1 and P1' will have different labels, the path over which the traffic will travel will be the same. While this approach will cause two different entries to be entered into the network element's forwarding table (one for each direction of the bi-directional path) the network element will be able to perform label based switching and will not be required to use information associated with the input port in connection with making a forwarding decision for the traffic. The invention is not limited to an embodiment in which bi-directional paths are able to be established or to one particular manner of establishing the bi-directional paths.

A node may advertise a path that does not terminate at itself. Accordingly, since labels are globally unique, if a node advertises two or more path segments that meet upstream of itself, it will in effect create a tree of path segments which merge. In this manner, a node may create a many to one tree such that multiple destinations may reach it via explicitly described path segments. Similarly, a one to many (broadcast) tree may be created in which packets originate and flow along the path segments, but are copied and forwarded at the merging points of the segments. In general, a node can create a tree of path segments or even a cycle of path segments anywhere in the network. The tree can be followed in either direction so that the tree may be a one to many or many to one tree by simply using a different forwarding paradigm, regardless of how the paths are advertised.

Figure 8:
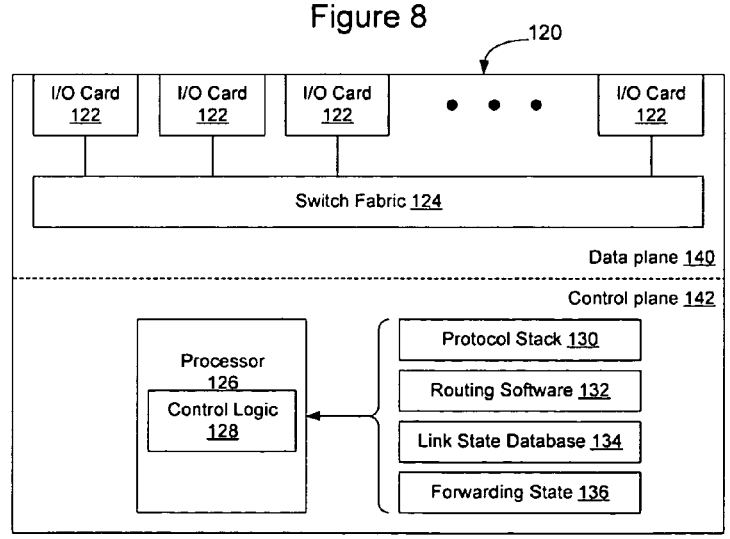
FIG. 8 is a functional block diagram of a network element configured to establish forwarding state on a communication network using path state advertisements according to an embodiment of the invention.

FIG. 8 shows a functional block diagram of a network element configured to enable paths to be created using path state advertisements. The network element in FIG. 8 is configured to generate paths state advertisements and broadcast the path state advertisements on the network. In addition, the network element is configured to receive path state advertisements and learn therefrom how forwarding state should be created to enable paths to be implemented through the network. The invention is not limited to the embodiment shown in FIG. 8 however, as many other types of network elements and network elements with architectures different than that shown in FIG. 8 may be used as well.

In the embodiment shown in FIG. 8, the network element 120 includes a data plane 140 including a plurality of input/output cards 122 configured to receive data from a communication network and output data on to the communication network. Particular input/output cards may perform both input and output functions or may selectively perform only one of these functions. Data may be switched between the cards via switch fabric 124. Optionally, the data plane may contain one or more service cards, such as one or more cards configured to perform one or more processes on the received packets, and the invention is not limited to an embodiment in which only the particular illustrated cards are used to implement the data plane of the network element 120. The data plane of FIG. 8 may be implemented to perform label switching such that packets received with particular labels may be automatically output over an intended interface to cause those packets to be forwarded through the network along the paths discussed above.

The manner in which data is handled by the data plane of the network element 120, i.e. the particular forwarding state to be established to implement the paths through the network, is controlled by a control plane 142 generally including a processor 126 containing control logic 128. The control plane may be implemented as one or more control cards/data service cards and the invention is not limited by the particular manner in which the control plane is implemented.

The control logic 128 may implement one or more processes, such as a process to implement a protocol stack 130 to enable the network element to be able to implement using one or more networking protocols so that it can participate in communications on the communication network. The network element may also include routing software 132 configured to receive and generate link state advertisements, enable the network element to compute paths through the network, generate path state advertisements, and extract forwarding state information from received path state advertisements. For example, in addition to other functions, the routing software 132 may be configured to implement the process described above in connection with FIG. 7.

The routing software may interface with a link state database 134 to maintain a current topography of the network on which it is operating. Additionally, the routing software may interface with a forwarding state database 136 containing information associated with paths through the network and/or associated with how packets containing particular path IDs should be handled by the network element. The forwarding state database 136 may contain a complete list of all paths through the network, a complete list of those paths that pass through the network element, or other information that will enable the network element to recover from a failure, should it be necessary to restart the network element or otherwise recover from a fault on the network/network element. Other modules may be included as well and the invention is not limited to a network element configured to implement only these several illustrated processes.

Although an embodiment has been shown in which the network element includes both a control and a data plane, the invention is not limited in this manner as the network element may be a virtual network element such as a virtual router in which the control is separate from the forwarding state. For example, a computer may act logically as several nodes and communicate forwarding state to the network elements via control channels. Thus, the invention is not limited to the embodiment shown in FIG. 8 as many different ways of implementing embodiments of the invention may be created.

Additionally, although an embodiment has been described in which path state advertisements are used to create paths, the path state advertisements may be used to remove paths as well. For example, if a node already has forwarding state for a particular path and receives a path state advertisement containing new forwarding state for the path, the node will remove the old forwarding state and use the new forwarding state. Additionally, the path state advertisement may include a flag indicating that the path is being removed, to enable the network elements to remove all state information associated with the path when the path is no longer necessary. Thus, path state advertisements may be used for more than simply creating new paths but may also be used to modify existing paths or to remove existing paths.

The functions described above may be implemented as a set of software program instructions that are stored in a computer readable memory within the network element and executed on one or more processors within the network element. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A network element, comprising:
a forwarding plane; and
a control plane, the control plane containing at least one processor containing control logic configured to implement a link state routing process to enable the network element to receive and forward link state advertisements to enable the link state advertisements to be flooded on the network, the link state routing process further being configured to enable the network element to receive and forward path state advertisements to enable the path state advertisements to be flooded on the network as if they were link state advertisements in the link state routing protocol;
wherein the path state advertisements comprise at least one path entry, the path entry relating to a previously calculated proposed path to be established through at least a portion of a communication network and including at least a path identifier and path information defining the previously calculated path that is to be established through the portion of the communication network.

2. The network element of claim 1, wherein the link state routing process is further configured to parse the received path state advertisements for path entries that reference the network element or that reference at least one link connected to the network element, and to cause forwarding state to be installed on the network element for those entries that reference the network element or that reference at least one link connected to the network element, the forwarding state enabling the network element to forward traffic on the paths associated with the entries that reference the network element.

3. The network element of claim 2, wherein the link state routing process is further configured to extract from the path state advertisement information that the network element will need to use to cause the forwarding state to be installed on the network element.

4. A network element, comprising:
a forwarding plane; and
a control plane, the control plane containing at least one processor containing control logic configured to implement a link state routing process to enable the network element to receive and forward link state advertisements to enable the link state advertisements to be flooded on the network, and control logic further configured to enable the network element to receive and forward path state advertisements to enable the path state advertisements to be flooded on the network as if they were link state advertisements in the link state routing protocol;
wherein the path state advertisements comprise at least one path entry, the path entry relating to a previously calculated proposed path to be established through at least a portion of a communication network and including at least a path identifier and path information defining the previously calculated path that is to be established through the portion of the communication network;
wherein the control logic is further configured to parse the received path state advertisements for path entries that reference the network element or that reference at least one link connected to the network element, and to install forwarding state on the network element for those entries that reference the network element or that reference at least one link connected to the network element, the forwarding state enabling the network element to forward traffic on the paths associated with the entries that reference the network element; and
wherein the control logic is further configured to parse the received path state advertisements for path entries that reference the network element or that reference at least one link connected to the network element, and to not install forwarding state on the network element for any path where the path information for the path contained in the path state advertisement does not reference the network element and does not reference at least one link connected to the network element.

5. The network element of claim 2, wherein the path state advertisements contain path information defining multiple previously calculated paths that are to be established through the portion of the communication network.

* * * * *